United States Patent
Frampton et al.

(10) Patent No.: US 9,279,379 B2
(45) Date of Patent: Mar. 8, 2016

(54) POSITION BASED AIR/FUEL RATIO CALCULATION IN AN INTERNAL COMBUSTION ENGINE

(71) Applicant: Kohler Co., Kohler, WI (US)

(72) Inventors: Isaac S. Frampton, Strattanville, PA (US); Robert J. Danforth, III, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 272 days.

(21) Appl. No.: 14/013,398

(22) Filed: Aug. 29, 2013

(65) Prior Publication Data

US 2015/0059698 A1    Mar. 5, 2015

(51) Int. Cl.
| | |
|---|---|
| *F02D 41/30* | (2006.01) |
| *F02D 41/00* | (2006.01) |
| *F02D 41/14* | (2006.01) |
| *G01M 15/06* | (2006.01) |
| *F02D 35/02* | (2006.01) |
| *F02D 41/22* | (2006.01) |
| *F02P 13/00* | (2006.01) |

(52) U.S. Cl.
CPC .......... *F02D 41/0097* (2013.01); *F02D 35/026* (2013.01); *F02D 41/1458* (2013.01); *F02D 41/1497* (2013.01); *G01M 15/06* (2013.01); *F02D 35/024* (2013.01); *F02D 41/009* (2013.01); *F02D 41/22* (2013.01); *F02D 2200/101* (2013.01); *F02D 2200/1002* (2013.01); *F02D 2200/1004* (2013.01); *F02D 2200/1012* (2013.01); *F02P 13/00* (2013.01)

(58) Field of Classification Search
CPC ............ F02D 41/0097; F02D 41/1497; F02D 41/009; G01M 15/06
USPC ................ 123/436; 701/103, 110; 73/114.22, 73/114.24, 114.25
See application file for complete search history.

(56) References Cited

U.S. PATENT DOCUMENTS

| | | | |
|---|---|---|---|
| 4,621,603 | A | 11/1986 | Matekunas |
| 4,788,854 | A | 12/1988 | Javaherian et al. |
| 5,107,813 | A | 4/1992 | Inoue et al. |
| 5,682,867 | A | 11/1997 | Katoh et al. |
| 5,805,540 | A | 9/1998 | Kitai et al. |

(Continued)

FOREIGN PATENT DOCUMENTS

| | | |
|---|---|---|
| EP | 1420155 A2 | 5/2004 |
| EP | 1571333 A1 | 9/2005 |
| WO | WO-2012157067 A1 | 11/2012 |

OTHER PUBLICATIONS

"European Application Serial No. 14171970.8, Extended European Search Report mailed Sep. 2, 2015", 12 pgs.

(Continued)

*Primary Examiner* — Hai Huynh
(74) *Attorney, Agent, or Firm* — Schwegman Lundberg & Woessner, P.A.

(57) ABSTRACT

Some embodiments relate to an internal combustion engine that includes a combustion chamber and a rotating component. The internal combustion engine further includes a sensing system that detects an angular position of the rotating component. A controller calculates a ratio between air and fuel in the combustion chamber based on the detected position of the rotating component. As an example, the rotating component may be a crankshaft where the controller calculates a speed of the crankshaft and an acceleration of the crankshaft based on the detected position of the crankshaft.

17 Claims, 10 Drawing Sheets

(56) References Cited

U.S. PATENT DOCUMENTS

| | | |
|---|---|---|
| 5,934,230 A | 8/1999 | Uytdewilligen et al. |
| 6,189,495 B1 | 2/2001 | Tuckey et al. |
| 6,250,292 B1 * | 6/2001 | Suhre ............................ 123/688 |
| 6,397,828 B2 * | 6/2002 | Poggio et al. ................. 123/673 |
| 6,467,456 B2 | 10/2002 | Shidara et al. |
| 6,550,239 B2 | 4/2003 | Almkvist et al. |
| 6,622,690 B2 | 9/2003 | Ando et al. |
| 6,691,664 B2 | 2/2004 | Pisano et al. |
| 6,718,959 B2 * | 4/2004 | Kim ............................... 123/692 |
| 6,799,422 B2 | 10/2004 | Westerbeke, Jr. et al. |
| 6,938,594 B2 | 9/2005 | Katayama et al. |
| 6,957,635 B2 | 10/2005 | Katayam |
| 7,409,933 B2 | 8/2008 | Nino |
| 7,440,841 B2 * | 10/2008 | Ripley ........................... 701/111 |
| 7,809,489 B2 | 10/2010 | Koeller et al. |
| 7,882,730 B2 | 2/2011 | Tanaya et al. |
| 8,190,351 B2 | 5/2012 | Fukuchi et al. |
| 2001/0025634 A1 | 10/2001 | Poggio et al. |
| 2003/0111068 A1 | 6/2003 | Kim |
| 2003/0167118 A1 | 9/2003 | Rizzoni et al. |
| 2005/0022789 A1 | 2/2005 | Palma et al. |
| 2007/0215118 A1 | 9/2007 | Komori et al. |
| 2008/0271699 A1 | 11/2008 | Wellev et al. |
| 2011/0100327 A1 * | 5/2011 | Nakagawa et al. ............ 123/445 |
| 2012/0125276 A1 | 5/2012 | Baldwin et al. |
| 2012/0160223 A1 | 6/2012 | Polgar |
| 2014/0290622 A1 * | 10/2014 | Ikeda et al. ................... 123/344 |

OTHER PUBLICATIONS

"Machine Translation of WO 2012/157067A1, published Nov. 22, 2012", 13 pgs.

Tunestal, Per, et al., "Cylinder air/fuel ratio estimation using net heat release data", *Control Engineering Practice*, 11, (2003), 311-318.

* cited by examiner

POSITION BASED AIR/FUEL RATIO CALCULATION IN AN INTERNAL COMBUSTION ENGINE

TECHNICAL FIELD

Embodiments pertain to an internal combustion engine, and more particularly to calculating air/fuel ratio used in combustion chambers within an internal combustion engine.

BACKGROUND

A typical engine has an exhaust manifold that receives and combines exhaust gasses from each cylinder of the engine and directs the combined exhaust gasses from the engine to an exhaust system and eventually to the atmosphere. An operating variable is typically monitored with a feedback sensor located in the exhaust stream which provides a feedback signal to an electronic controller. As an example, the controller may provide data relative to the air/fuel ratio of the internal combustion engine.

One common variable that is monitored by the feedback sensor is oxygen concentration in exhaust gases. When the monitored variable is exhaust oxygen concentration in exhaust gases, the feedback sensor may be a narrow-band oxygen sensor.

The exhaust sensor in some internal combustion engine directly measures oxygen content of the combined exhaust from all cylinders in the engine. This data typically does not directly correlate to the actual ratio between air and fuel in each individual cylinder that is part of the internal combustion engine.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
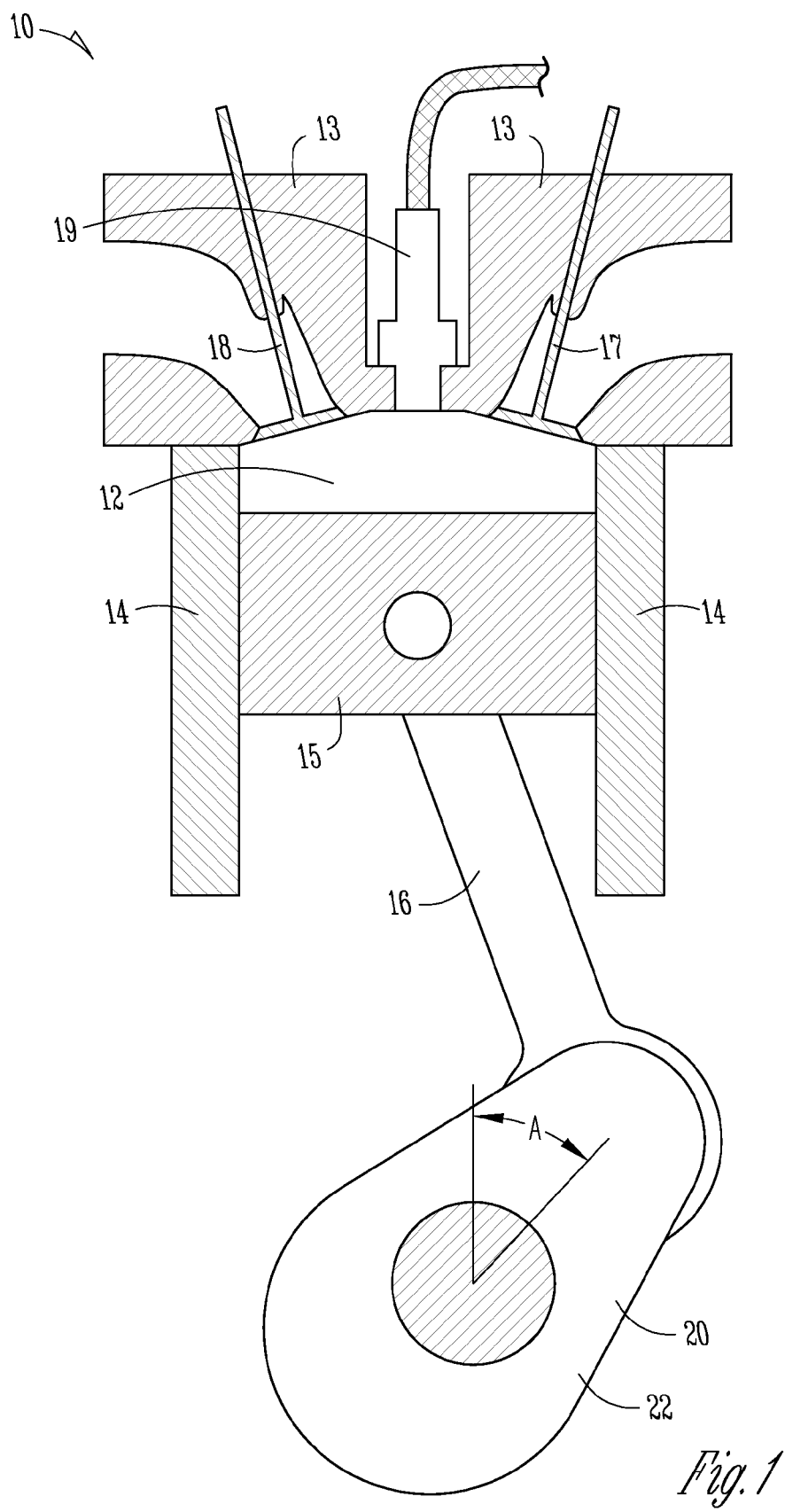
FIG. 1 illustrates an example combustion chamber of an internal combustion engine.
Figure 2:
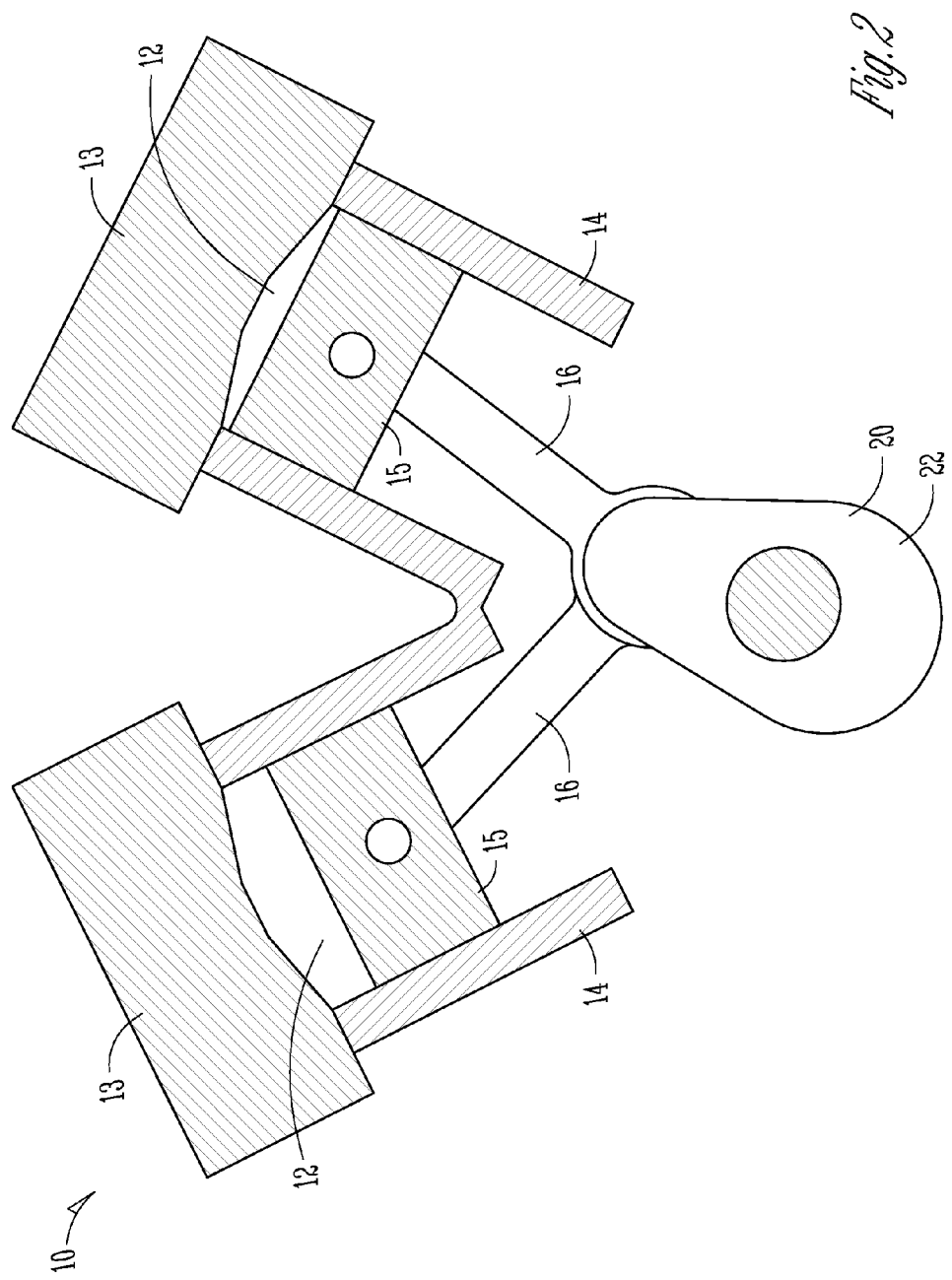
FIG. 2 illustrates an example portion of an internal combustion engine that includes a plurality of combustion chambers.
Figure 3:
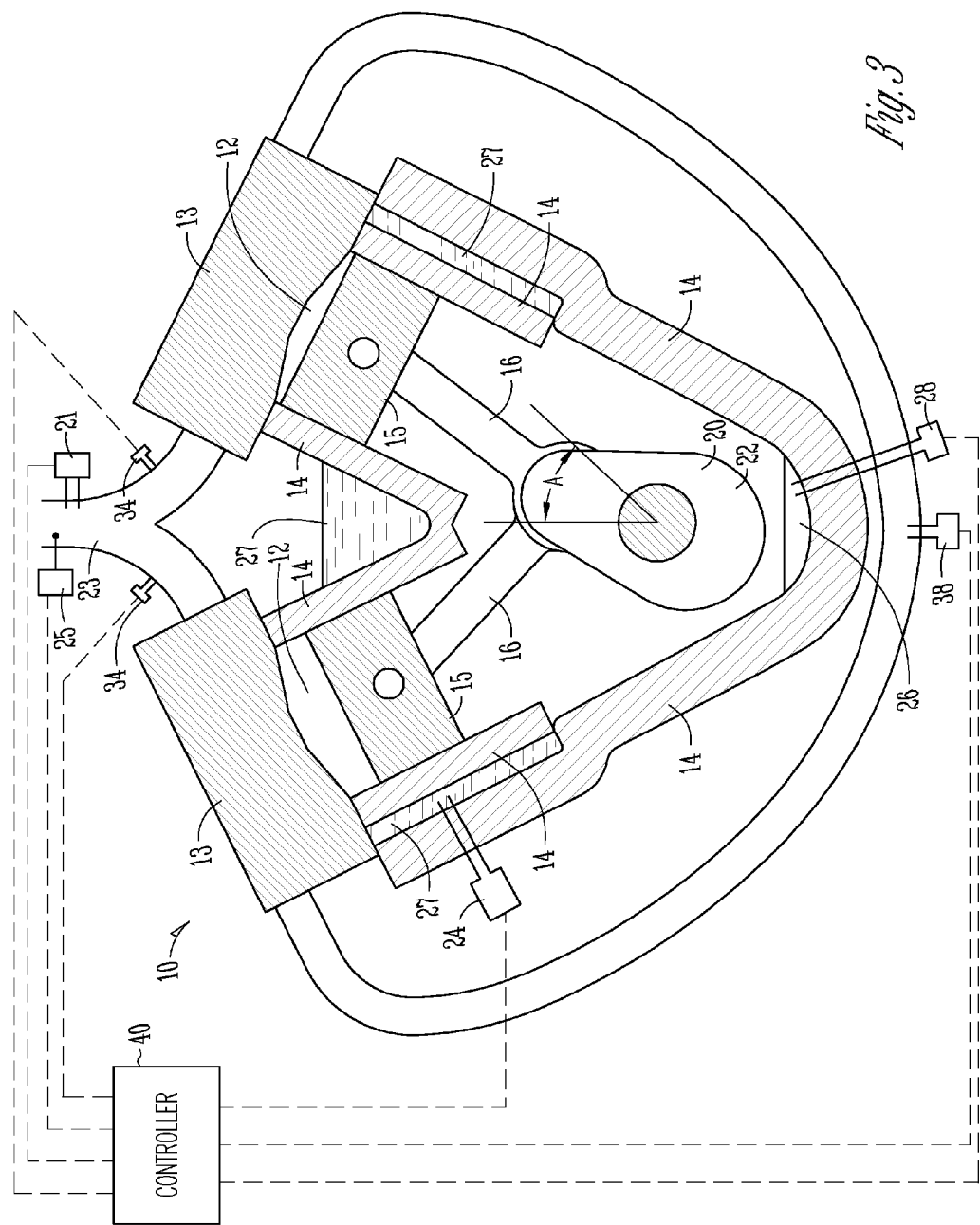
FIG. 3 illustrates an example portion of an internal combustion engine that includes a plurality of sensors.

FIGS. 1-3 illustrate an example internal combustion engine 10. The internal combustion engine 10 may include at least one combustion chamber 12. The combustion chamber(s) 12 may be bounded by a cylinder head 13, a cylinder block 14 and a piston 15.

The internal combustion engine 10 may further include an intake valve 17 for selectively permitting air and fuel to enter the combustion chamber 12, and an exhaust valve 18 for selectively permitting combustion byproducts to exit the combustion chamber 12.

The internal combustion engine 10 may additionally or alternatively include a spark plug 19. The spark plug 19 may use electrical energy to ignite the air and fuel mixture in the combustion chamber 12 by initiating a flame kernel.

Figure 4:
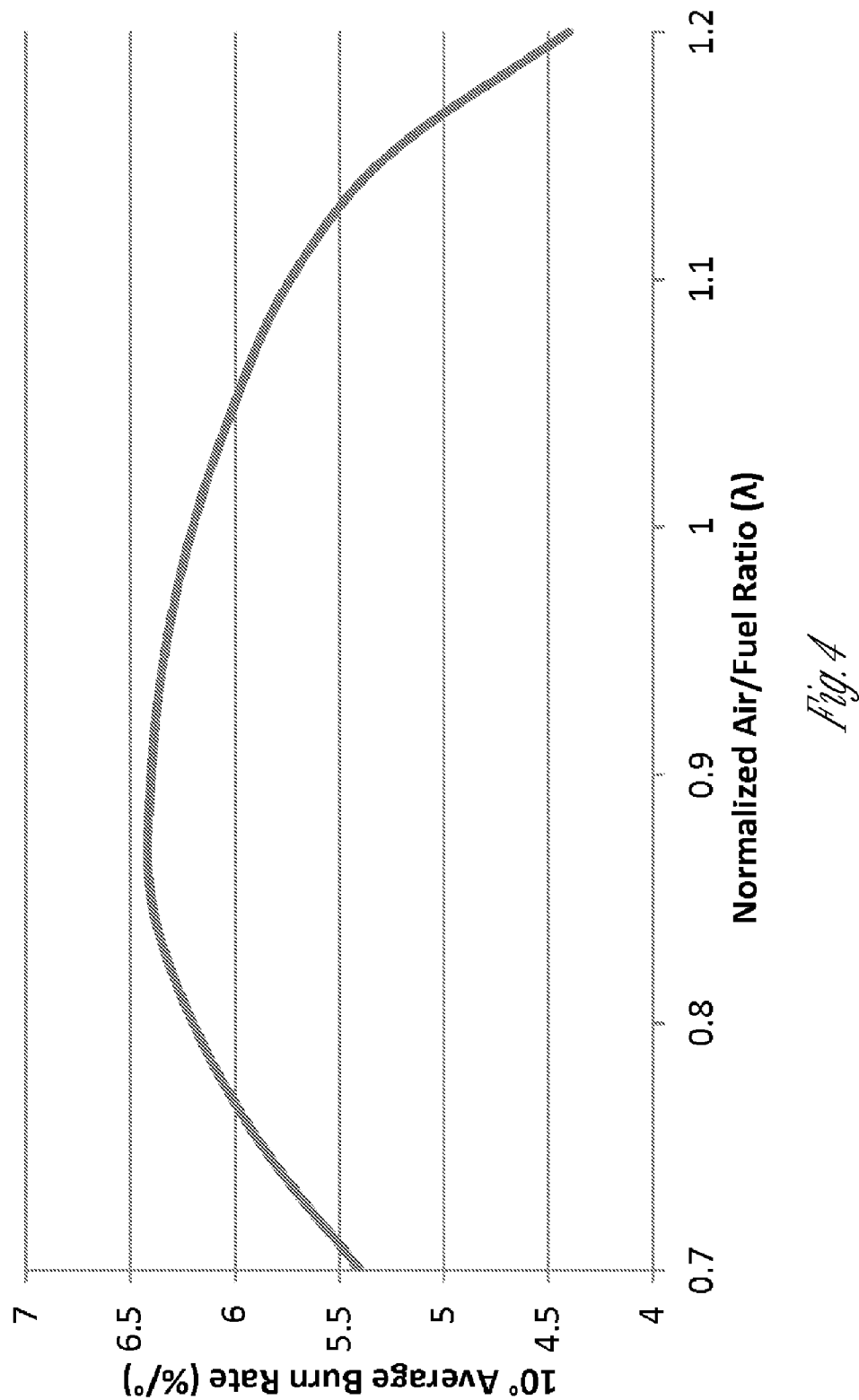
FIG. 4 is an example curve illustrating burn rate at various ratios between air and fuel at a given air pressure in the intake manifold.

The flame kernel propagates in the combustion chamber 12 at a rate which may be dependent on the pressure of, and/or the ratio between, the air and fuel mixture in the combustion chamber 12 (among other factors). This propagation rate is known as the burn rate. FIG. 4 is a curve that illustrates an example rate at which the flame kernel propagates in the combustion chamber 12 at various ratios between air and fuel in the combustion chamber 12 for a given pressure of gasses in the combustion chamber 12. The pressure in the combustion chamber 12 when the flame kernel is initiated may be primarily related to the intake manifold pressure 23 as measured by pressure sensor 21.

As the flame kernel propagates in the combustion chamber 12, the flame kernel may generate heat. Some of generated heat is transferred to the cylinder head 13, the cylinder block 14 and the piston 15. In addition, some of the generated heat may cause the gas in the combustion chamber 12 to expand. The expanded gas may create an increased pressure which applies a force to the piston 15. Part or all of the remainder of the generated heat may exit the combustion chamber 12 when the exhaust valve 18 opens.

The rate that the generated heat is transferred to the cylinder head 13, the cylinder block 14 and the piston 15 may be largely dependent on the temperature of the cylinder head 13, the cylinder block 14 and the piston 15. The temperature of the cylinder head 13 and the cylinder block 14 may be primarily related to the temperature of a coolant flowing through the cylinder head 13 and through the cylinder block 14. The coolant may be a liquid coolant, such as liquid coolant 27 shown in FIG. 3, or air.

The temperature of the piston 15 may be primarily related to the temperature of the engine lubricating oil 26. As an example, the temperature of the engine lubricating oil 26 may be measured by a temperature sensor 28, with a different sensor, or in a different manner.

The piston 15 may be connected to a rotating component 20 of the internal combustion engine 10 via some form of a connecting link 16. As an example, the rotating component 20 of the internal combustion engine 10 may be a crankshaft 22. The piston 15 may reciprocate back and forth as the crankshaft 22 rotates.

The force applied to the reciprocating piston(s) 15 may be applied to crankshaft 22 at an angle A resulting in torque being applied to the crankshaft 22. The momentary torque applied to the crankshaft 22 may be determined based on the angular acceleration of the crankshaft 22 and a known inertia of the crankshaft 22. The momentary force applied to the reciprocating piston(s) 15 may be calculated based on the momentary torque applied to the crankshaft 22 and the momentary angle A.

The reciprocating piston 15 has a known area. Therefore, the momentary pressure against the piston 15 may be calculated from the momentary force that is applied to the reciprocating piston(s) 15. The momentary burn rate may be calculated based on the estimated initial quantity of air and fuel in the combustion chamber 12 and the momentary pressure of the gas against the reciprocating piston 15.

The ratio between the air and fuel in the combustion chamber 12 may be calculated based on the momentary burn rate and the momentary pressure of the gas in the combustion chamber 12.

Figure 5:
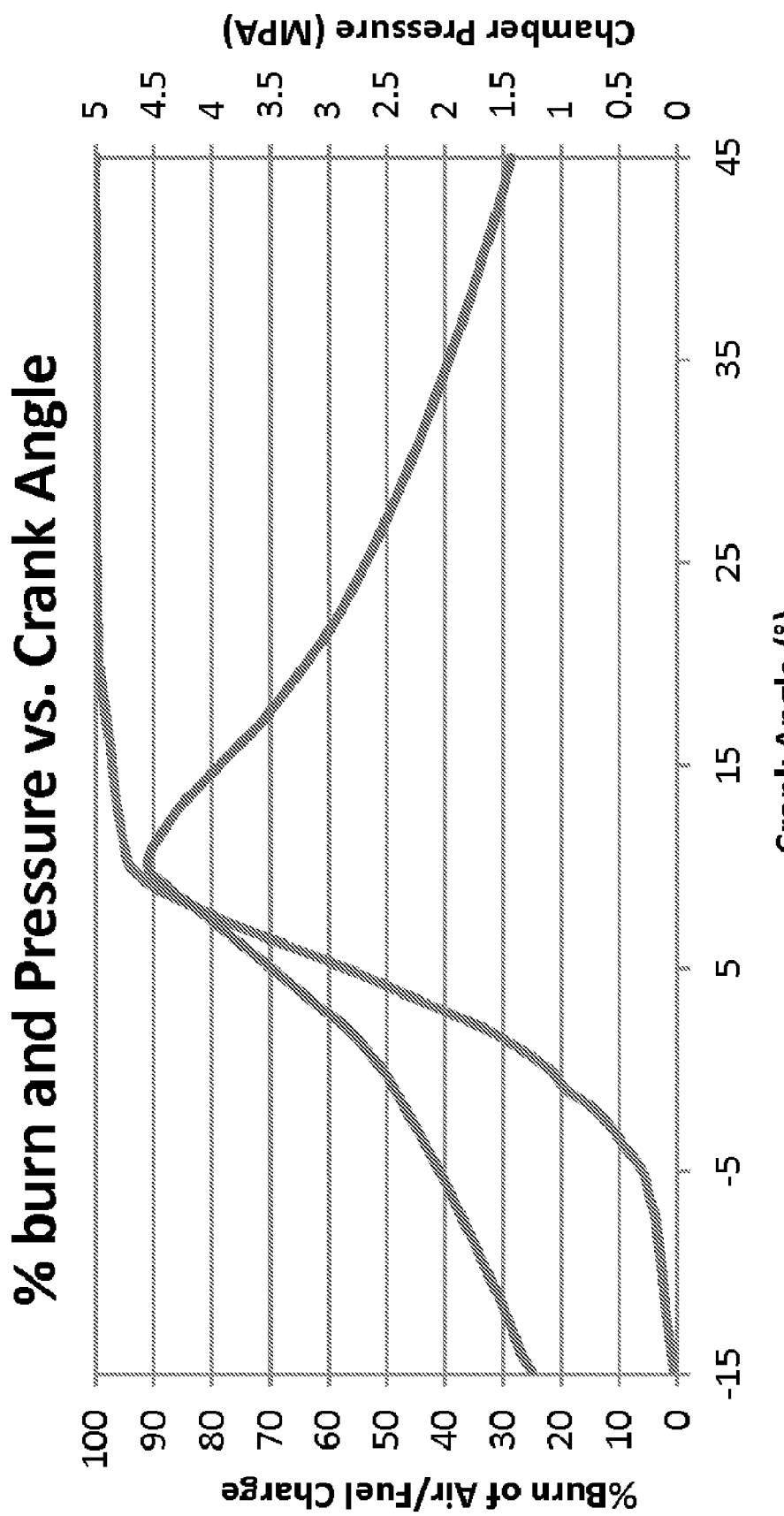
FIG. 5 is an example graph illustrating pressure and burn rate of an air and fuel mixture at various momentary crank angles.

The initial quantity of air and fuel in the combustion chamber 12 may be estimated using a volumetric efficiency table and the pressure of the gas in the intake manifold 23. FIG. 5 illustrates an example relationship between various momentary angles A and (i) the pressure of the gas in combustion chamber 12 and (ii) the percentage of the air and fuel mixture in the combustion chamber 12 that has burned.

The internal combustion engine 10 may include additional sensors. As examples, the internal combustion engine 10 may include a throttle position sensor, an air mass flow rate meter, a volumetric flow meter, a fuel pressure sensor (among other sensors). These sensors may be used to estimate the initial quantity of air and fuel in the combustion chamber 12 (among other functions).

The internal combustion engine 10 may include or connect with a controller 40. The controller 40 may calculate a ratio between air and fuel in the combustion chamber 12 based on the detected position of the rotating component 20. The controller 40 may receive data from various sensors and perform various calculations necessary to determine the ratio between air and fuel in the combustion chamber 12. The controller 40 of the internal combustion engine 10 may also control (such as with control signals) the pulse width of fuel injector 34 and/or the ignition timing of the internal combustion engine 10.

The controller 40 may additionally or alternatively estimate the initial quantity of air and fuel in the combustion chamber 12 using the pulse width of the fuel injector 34 and/or the ignition timing of the internal combustion engine 10 (among other functions). The initial quantity of air and fuel in the combustion chamber 12 determines the charge density of air and fuel in the combustion chamber 12. The expected burn rate of the air and fuel in the combustion chamber 12 may be related to the charge density of air and fuel in the combustion chamber 12.

Figure 6A:
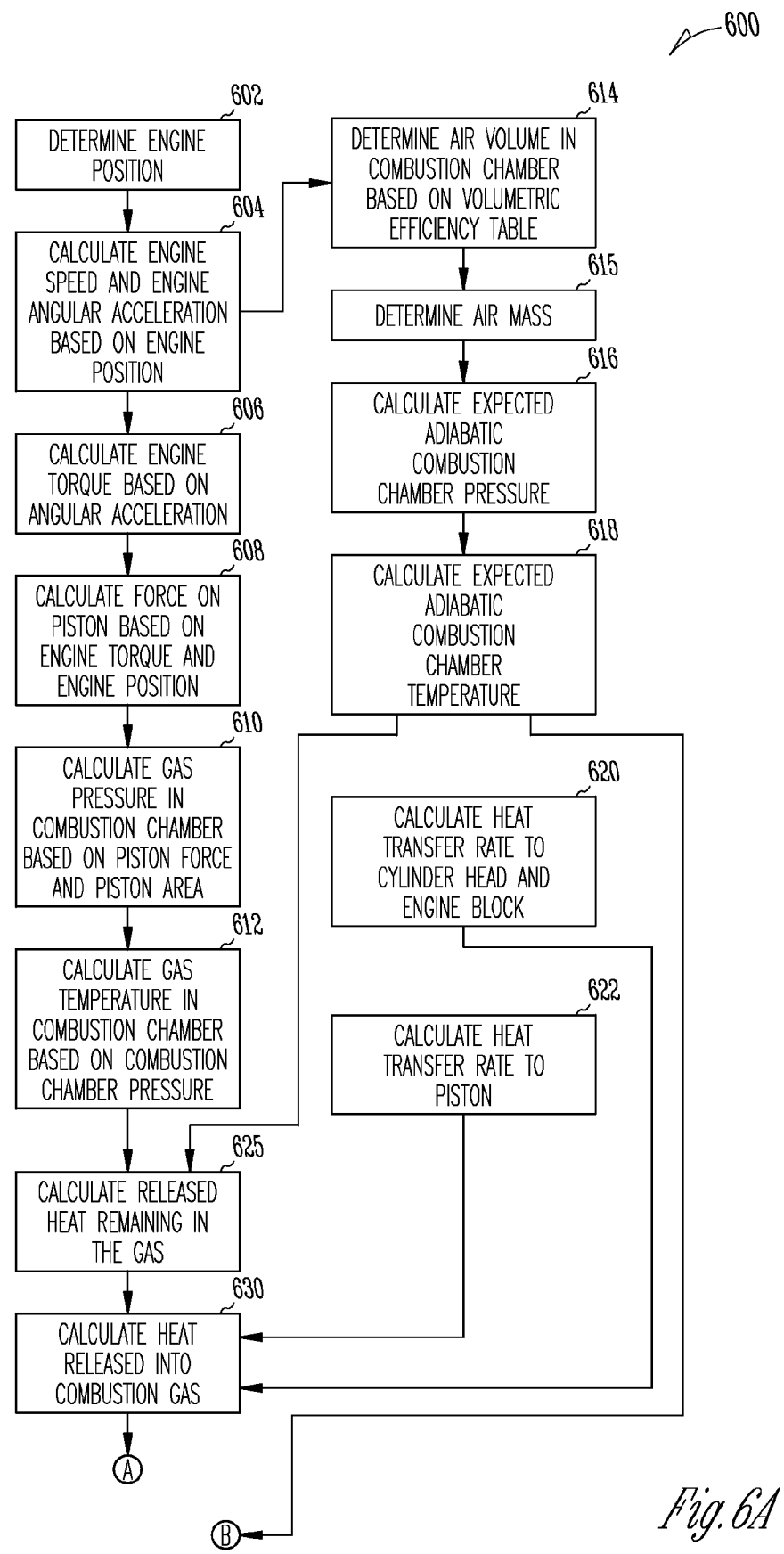
FIGS. 6A-6B are flowcharts illustrating an example process for calculating a ratio between air and fuel in a combustion chamber.
Figure 6B:
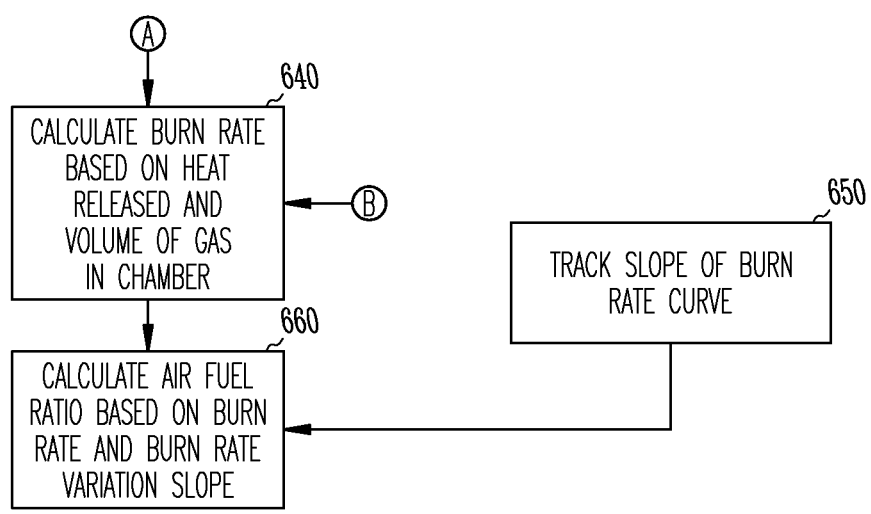

FIGS. 6A-6B illustrate an example method or process [600] by which a ratio between air and fuel in a particular combustion chamber 12 may be calculated. The ratio between air and fuel may be based on the pressure in the intake manifold 23 as measured by an intake manifold pressure sensor 21, engine coolant temperature as measured by a coolant temperature sensor 24 and momentary angle A as measured by sensing system 50, or may be based on other variables.

The process [600] may be performed by the controller 40 or various other components. The process [600] may be implemented as logic, which the controller 40 may perform.

The process may include [602] determining a position of the internal combustion engine 10 (or a component of the internal combustion engine 10, such as the crankshaft 22 or a piston 15) based on input from a sensing system 50. As an example, the sensing system 50 may be a crankshaft position sensor, which may send information about a crankshaft position to the controller 40.

The process may further include [604] calculating a speed and angular acceleration of a component of the internal combustion engine 10. The speed and angular acceleration of the component may be calculated using the input from the sensing system 50, such as the crankshaft position from a crankshaft position sensor. As an example, the speed and angular acceleration of the internal combustion engine 10 may be calculated (such as by the controller 40) by determining a time that the internal combustion engine 10 (or a component of the internal combustion engine 10) is at a first position and determining a time that the internal combustion engine 10 (or the component of the internal combustion engine 10) is at a second position to establish the total time difference it takes to move between the first position and the second position.

The speed of the internal combustion engine 10 (or a component of the internal combustion engine 10), such as rotating component 20, may be determined by dividing the distance between the first position and the second position by the total time difference it takes to move between the first position and the second position. The angular acceleration of the rotating component 20 may then be determined by the difference between a first speed of the rotating component 20 at one point in time and a second speed of the rotating component 20 at a second point in time and then dividing the difference in speed by the total time between the first point in time and the second point in time. Other variations are possible. It should be noted that some portions of the specification may interchangeably refer to the position, speed and acceleration of the internal combustion engine 10 and/or the position, speed and acceleration of the rotating component 20 (or another component of the internal combustion engine 10).

The process may further include [606] calculating internal combustion engine 10 torque from angular acceleration. As an example, the torque produced by the internal combustion engine 10 may be directly proportional to the rate at which the rotating component 20 angularly accelerates and the inertia of the rotating component 20. The inertia of the internal combustion engine 10 may be a fixed quantity and may include contributions from crankshaft 22, piston 15, connecting rod 16 and other components driven by the internal combustion engine 10. Thus, the torque may be estimated by multiplying the inertia of the internal combustion engine 10 and the calculated angular acceleration.

The process may further include [608] calculating a force on a particular piston 15. The force may be calculated based on the torque and position of the internal combustion engine 10. As an example, the moment arm of the crankshaft 22 (which may be or correspond to the position of the internal combustion engine 10) may vary as the momentary angle A changes. The internal combustion engine 10 torque produced may be proportional to the product of the moment arm and the force on the particular piston 15. As such, the force on the particular piston 15 may be calculated (such as by the controller 40) as the torque divided by the moment arm.

The process may further include [610] calculating pressure of a gas in the particular combustion chamber 12 based on the force on a particular piston 15 and the area of the piston 15. The force on the particular piston 15 may be proportional to the product of the pressure of the gas in the particular combustion chamber 12 and the area of the piston 15, which may be a known or calculable value. As such, the pressure of the gas may be calculated (such as by controller 40) as the calculated force divided by the area of the piston 15.

The process may further include [612] calculating (or estimating) the temperature of the gas in the particular combustion chamber 12. The temperature of the gas may be calculated or estimated based on the pressure of the gas in the particular combustion chamber 12. As an example, the relationship between gas temperature and gas pressure in the particular combustion chamber 12 may be estimated using the ideal gas law.

The process may further include [614] determining air volume in the combustion chamber 12. As an example, the air volume in the combustion chamber 12 may be determined from a volumetric efficiency table based on the pressure of the air in the intake manifold 23 as measured by the pressure sensor 21 and the angular speed of the rotating component 20, such as the crankshaft 22.

In some example methods, the process may further include [615] determining an air mass in the combustion chamber 12. The air density may be determined from an air density table based on intake air temperature as measured by temperature sensor 25. The air mass may be calculated by multiplying the air density by the air volume in the combustion chamber 12.

The temperature of the air in the intake manifold 23 may also be used to determine an initial temperature in the combustion chamber 12.

The process may further include [616] calculating an expected adiabatic gas pressure in the combustion chamber, such as by using the ideal gas law and/or Boyles law. The process may further include [618] calculating expected adiabatic gas temperature in the combustion chamber using the expected adiabatic gas pressure in the combustion chamber. As an example, the expected adiabatic pressure and temperature in the combustion chamber may be estimated using the ideal gas law based on the momentary crank angle A and the pressure and temperature of the air and fuel mixture in the intake manifold 23.

The process may further include [620] calculating the heat transfer rate to the cylinder head 13 and the cylinder block 14. As an example, the heat transfer rate to the cylinder head 13 and the cylinder block 14 may be determined from a heat transfer table based on the difference between the temperature of the air and fuel in the combustion chamber 12 and the engine coolant temperature as measured by temperature sensor 24.

The process may further include [622] calculating the heat transfer rate to the piston 15. As an example, the heat transfer rate to the piston 15 may be determined from a heat transfer table based on the difference between the temperature of the air and fuel in the combustion chamber 12 and the engine oil temperature 26 as measured by a temperature sensor 28. In addition, engine oil temperature may also be estimated based on internal combustion engine 10 load and operating time of the internal combustion engine 10 (among other methods of determining engine oil temperature).

The process may further include calculating the released heat remaining in the combustion gas. As an example, the released heat remaining in the combustion gas may be calculated by multiplying the difference between the temperature of the air and fuel in the combustion chamber 12 and the expected adiabatic temperature of the gas in the combustion chamber by the volume of the gas in the combustion chamber 12.

The process may further include [625] calculating released heat remaining in the gas in the combustion chamber 12. As an example, the released heat remaining in the gas in the combustion chamber 12 may be determined by the difference between the temperature of the gas in the combustion chamber 12 and the expected adiabatic temperature of the gas in the combustion chamber 12.

The process may further include [630] calculating a total heat released into the gas in the combustion chamber 12. The total heat released into the gas in the combustion chamber 12 may be calculated as the sum of the heat transfer rates to the cylinder head 13, cylinder block 14 and piston 15 and the released heat remaining in the gas in the combustion chamber 12.

The process may further include [640] calculating a burn rate of the air and fuel in the combustion chamber 12 based on the total heat released into the gas in the combustion chamber 12 and the mass of air and fuel in the combustion chamber 12.

The process may further include [650] tracking a slope of a burn rate curve (see, e.g., burn rate curve illustrated in FIG. 4). The slope of the burn rate curve may be established by comparing the burn rate of consecutive cycles of the internal combustion engine 10 and quantity of fuel injected into the combustion chamber 12 for the corresponding consecutive cycles of the internal combustion engine 10.

The process may further include [660] calculating the air and fuel ratio in the combustion chamber 12. As an example, the air and fuel ratio in the combustion chamber 12 may be determined from a table that includes data relating burn rate to a ratio between air and fuel in the combustion chamber 12 based on the burn rate of the air and fuel in the combustion chamber 12 and the slope of the burn rate curve.

Some burn rates may be equated to more than one air and fuel ratio. Therefore, it may be useful to establish the slope of the burn rate curve in order to determine the appropriate air and fuel ratio at a specific burn rate. As an example, when the slope of the burn rate curve is negative the internal combustion engine 10 is operating with an excess of air (lean).

The method of FIGS. 6A-6B may be utilized to determine or calculate a ratio between air and fuel in a particular combustion chamber 12. Calculating the ratio between air and fuel in the particular combustion chamber 12 in such a manner may enable the engine 10 to quickly adjust to changing system dynamics and more accurately maintain an efficient ratio between air and fuel. The method of FIGS. 6A-6B may be performed continuously, at intervals, when triggered by an event, randomly, or at various other times. One or more blocks of the method may be performed in a different order. For example, the controller 40 may calculate the heat transfer rate to the piston [622] after or concurrently with the calculation of the heat transfer rate to the cylinder head and engine block [620]. Additionally or alternatively, one or more blocks of the method of FIGS. 6A-6B may be omitted, new blocks may be added, and one or more blocks may be modified or altered. Other variations are possible.

Figure 7:
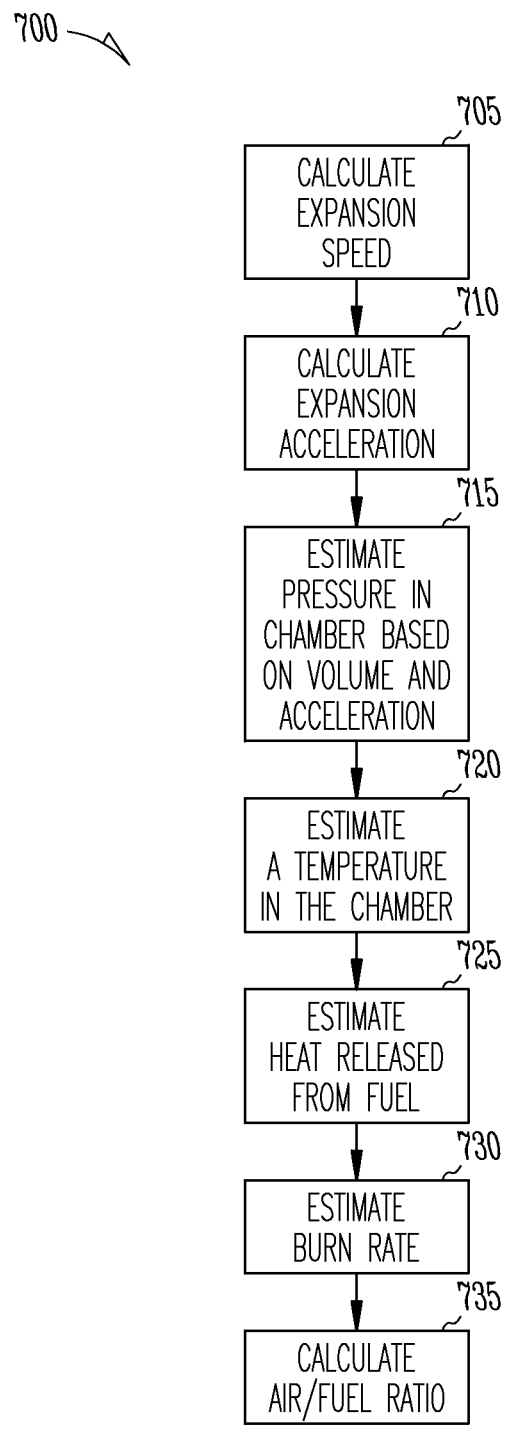
FIG. 7 is a flowchart illustrating another example process for calculating a ratio between air and fuel in a control volume.

FIG. 7 is a flowchart illustrating an example method or process [700] for calculating a ratio between air and fuel in a control volume. As used herein, a control volume may be defined as a bounded space such that all mass that enters or exits the bounded space is measured. Physical characteristics of the mass contained within the bounded space may be measured or estimated.

The method [700] may be performed by the controller 40 or various other components. The method [700] may be implemented as logic, which the controller 40 may perform.

The method may include [705] calculating expansion speed of an air and fuel mixture in a control volume. As an example, the expansion speed may be calculated by determining a rate of change of the control volume.

The method may further include [710] calculating momentary expansion acceleration of the air and fuel mixture in the control volume. As an example, the acceleration of the volume of the air and fuel mixture in the control volume may be calculated by the difference between a first expansion speed of the control volume at one point in time and a second expansion speed of the control volume at a second point in time and then dividing the difference between the first and second expansion speeds by the total time between the first point in time and the second point in time.

The method may further include [715] estimating pressure in the combustion chamber 12 based on momentary volume of the control volume and the momentary expansion acceleration of the control volume. As an example, the pressure in the control volume may be determined by multiplying the momentary expansion acceleration of the control volume by an inertia of a moving element that forms part of a boundary of the control volume to calculate a force on the moving element. The pressure in the control volume may then be determined by dividing the force on the moving element by the surface area of the moving element that forms part of the boundary of the control volume.

The method may further include [720] estimating a temperature in the combustion chamber 12 based on the pressure in the control volume. As an example, the temperature may be estimated using the pressure in the control volume and the momentary volume of the control volume using the ideal gas law.

The method may further include [725] estimating an amount of heat that is released from the air and fuel mixture in the control volume during combustion of the air and fuel in the control volume based on the temperature of the air and fuel mixture in the control volume. As an example, the temperature of the air and fuel mixture in the control volume may be compared with a calculated adiabatic temperature of the air and fuel mixture in the control volume to determine the amount of heat released from the air and fuel mixture in the control volume during combustion.

The method may further include [730] estimating the burn rate based on the amount of heat released from the air and fuel mixture in the control volume during combustion. As an example, the burn rate may be estimated by dividing the amount of heat released from the air and fuel mixture in the control volume during combustion by the total chemical energy contained in the air and fuel mixture.

The method may further include [735] calculating the ratio between air and fuel based on the burn rate of the air and fuel mixture in the control volume. As an example, the air and fuel ratio in the control volume may be determined from a table that includes data relating burn rate to a ratio between air and fuel in the control volume based on the burn rate of the air and fuel in the control volume.

As an example, it may be useful to detect the relationship between burn rate and provided fuel to the air and fuel mixture in the control volume in order to establish a slope of a burn rate curve. The slope of the burn rate curve may be used to determine if combustion in the control volume is occurring with excess air (i.e., lean) or excess fuel (i.e., rich).

The method of FIG. 7 may be utilized to determine or calculate a ratio between air and fuel in a particular combustion chamber 12. Calculating the ratio between air and fuel in the particular combustion chamber 12 in such a manner may be used with various types of internal combustion engines and with or without monitoring a rotating component in an internal combustion engine. The method of FIG. 7 may be performed continuously, at intervals, when triggered by an event, randomly, or at various other times. One or more blocks of the method may be performed in a different order. Additionally or alternatively, one or more blocks of the method of FIG. 7 may be omitted, new blocks may be added, and one or more blocks may be modified or altered. Other variations are possible.

Figure 8A:
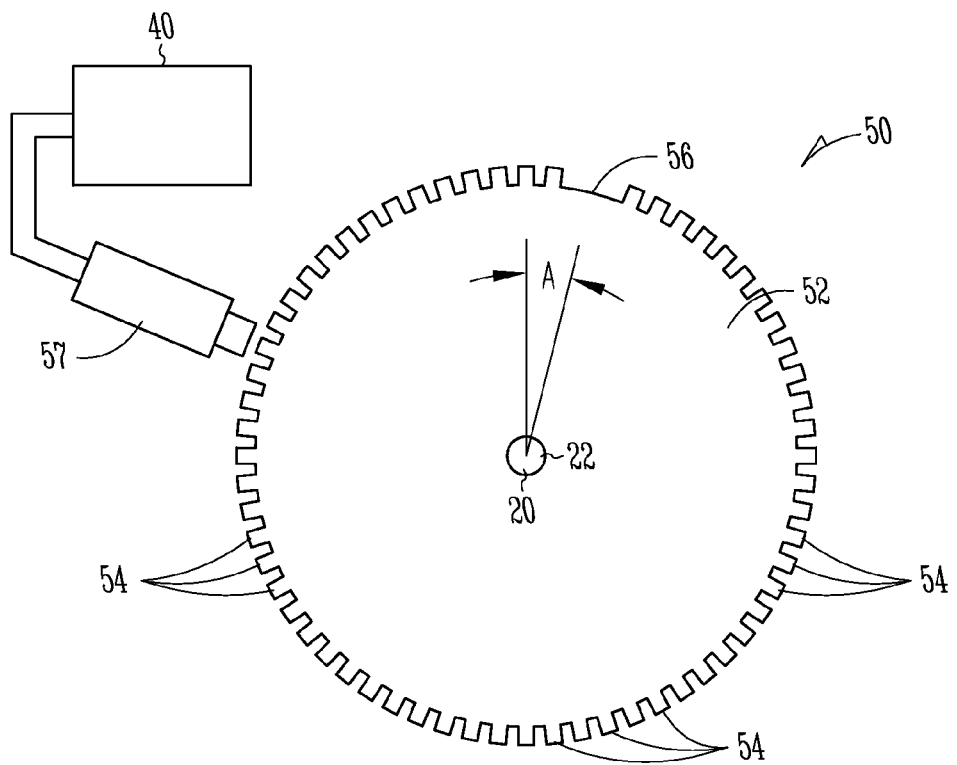
FIG. 8 illustrates an example sensing system of measuring momentary angle of a rotating component.
Figure 8B:
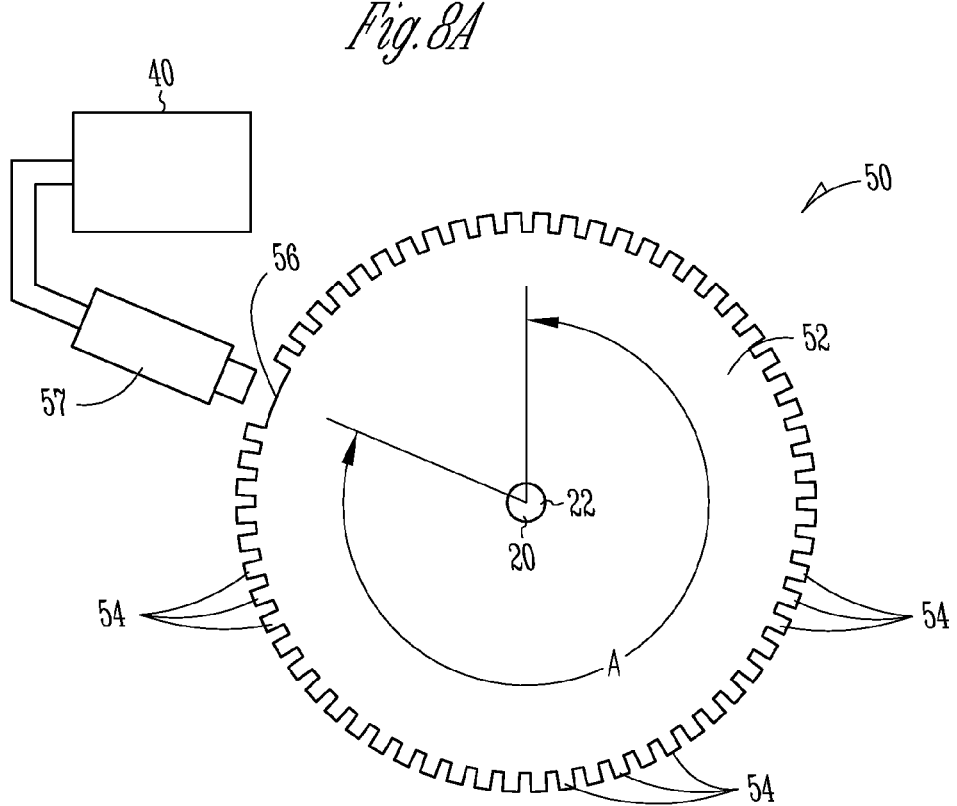

FIGS. 8A and 8B show an example sensing system 50 for measuring momentary angle A of a rotating component 20. Sensing system 50 may include a gear 52 that is attached to the rotating component 20 such that the angular position of the gear 52 establishes the angular position of the rotating component 20. The gear 52 may include a plurality of teeth 54 (or alternatively a plurality of grooves) around an outer periphery of the gear 52. The gear 52 may be missing teeth as indicated by gap 56 to provide a position reference for gear 52. Alternatively, some of the plurality of teeth 54 may be elongated or positioned asymmetrically around an outer periphery of the gear 52 to provide a position reference for gear 52. The teeth 54 and the gap 56 on the gear 52 may be detected using various sensors, such as a variable reluctance sensor 57 (or a Hall effect sensor).

The sensing system 50 that detects the speed and position of the crankshaft 22 may use a single sensor or a combination of sensors. As an example, the sensing system 50 may further include a position sensor on another rotating component of the internal combustion engine 10 such as a camshaft or dynamic balancing member.

The sensing system 50 may detect the position of any component in the internal combustion engine 10 which permits determination of the combustion chamber volume and may not include determining the position of a rotating component in the internal combustion engine 10. As an example, the sensing system 50 may measure a position of one or more piston(s) 15 in the internal combustion engine 10.

The sensing system 50 may use a variety of sensors to establish a position of the rotating component 20. Some examples include a resistive position sensor and an optical position sensor such as an optical encoder (among other optical devices).

A controller 40 may calculate a ratio between air and fuel in the combustion chamber(s) 12 based on the detected angular position of the rotating component 20.

As an example, the controller 40 may calculate a speed and an acceleration of the crankshaft 22 based on the detected position of the crankshaft 22. Once the controller 40 calculates a speed and an acceleration of the crankshaft 22, the controller 40 may determine a burn rate of the air and fuel in the combustion chamber 12 based on the speed, acceleration and detected position of the rotating component. As an example, the controller 40 may further calculate the ratio between air and fuel in the combustion chamber 12 based on the determined burn rate.

The controller 40 may adjust a quantity of fuel provided to the combustion chamber 12 based partially on the calculated ratio between air and fuel in the combustion chamber 12. When the internal combustion engine 10 includes a plurality of combustion chambers 12, the controller 40 may calculate the ratio between air and fuel in each of the plurality of combustion chambers 12 and individually adjust a quantity of fuel to each combustion chamber 12.

The controller 40 may alternatively, or additionally, calculate the ratio between air and fuel within the combustion chamber 12 based on the angular position of the crankshaft 22 and additional controller 40 characteristics of the internal combustion engine 10. An example additional controller 40 characteristic of the internal combustion engine 10 may include a time of initiation of combustion of the air and fuel within the combustion chamber 12.

The controller 40 may detect abnormal combustion of air and fuel within the combustion chamber 12 in some example internal combustion engines 10. An example of abnormal combustion of air and fuel may be when the combustion chamber 12 experiences a misfire. Abnormal combustion within the combustion chamber 12 may generate sensed characteristics that would indicate erroneous air and fuel ratio data. When the controller 40 recognized or identifies an abnormal combustion of air and fuel, the controller 40 may discard the sensed data and/or ignore a calculated air and fuel ratio for that cycle. The controller 40 may resume recognizing the sensed characteristics and/or calculating the air and fuel ratio when the combustion chamber 12 experiences normal combustion. In some instances, the controller 40 may continue to calculate air and fuel ratios during abnormal combustions, but may not act to control or adjust quantities of air or fuel provided to the combustion chamber based on the calculated air and fuel ratio during (or shortly after) the abnormal combustion. Other variations are possible.

The example internal combustion engine 10 described herein may be a spark ignited engine where fuel is injected directly into the combustion chamber 12. In this type of engine, the internal combustion engine 10 may be capable of introducing fuel into the combustion chamber 12 such that the ratio between air and fuel varies inside the combustion chamber 12. As an example, the internal combustion engine 10 may be a direct injected gasoline engine.

The example internal combustion engine 10 described herein may be a spark ignited engine where fuel in a gaseous form is mixed with the intake air before entering the combustion chamber 12. In this type of engine, the burn rate of the air and fuel in the combustion chamber 12 may vary significantly based on the specific heat of the fuel. As an example, the gaseous fuel may be natural gas which may vary in chemical composition depending on the geographical location of the source of the natural gas.

Figure 9:
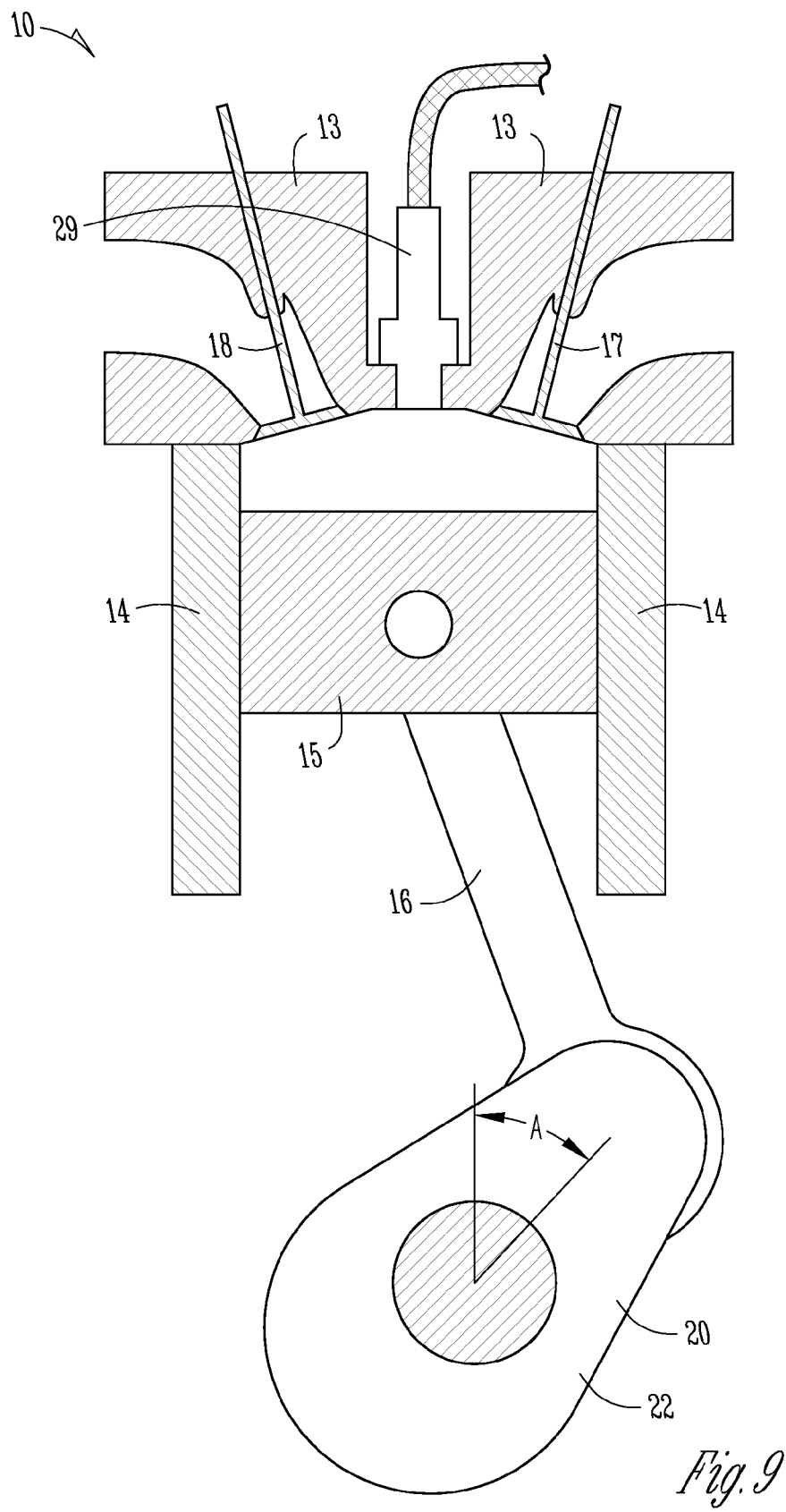
FIG. 9 illustrates an example combustion chamber of a compression ignition engine.

The systems and methods described herein may function with other types of engines. For example, FIG. 9 shows an example compression ignition engine including a fuel injector 29 that selectively provides fuel directly to the combustion chamber 12. As an example, the compression ignition engine 10 may operate using diesel fuel. In a compression ignition engine 10, the burn rate may be controlled by adjusting the quantity of fuel provided to the combustion chamber 12 at various momentary crank angles A.

The methods described herein may allow a ratio between air and fuel in a combustion chamber 12 of an internal combustion engine 10 to be determined. In some systems, the internal combustion engine 10 may or may not additionally include an oxygen sensor 38 that measures oxygen content in the exhaust gasses, which may be used to calculate a ratio between air and fuel in all combustion chambers 12 in the internal combustion engine 10.

The ratio between air and fuel that is calculated using the methods described herein (see, for example, FIGS. 6A-6B, 7) may, in contrast, be used to establish a ratio between air and fuel in each individual combustion chamber 12. Knowing the ratio between air and fuel in each combustion chamber 12 of internal combustion engine 10 may provide the ability to control a ratio between air and fuel in individual combustion chambers 12 of internal combustion engine 10. Controlling the ratio between air and fuel in individual combustion chambers 12 of internal combustion engine 10 may decrease the harmful emissions that are produced by the internal combustion engine 10. The harmful emissions that are produced by the internal combustion engine 10 may be decreased in part because all combustion chambers 12 may be individually controlled to an optimum ratio between air and fuel.

The systems and methods described herein may provide improved control feedback to the controller relating to the ratio between air and fuel. The systems and methods may establish a ratio between air and fuel of a first cycle of the internal combustion engine 10 upon completion of the power stroke of the first cycle. Establishing a ratio between air and fuel upon completion of the power stroke of the first cycle may allow adjustment of the fuel quantity prior to initiation of the intake stroke of a second cycle of the internal combustion engine 10. In contrast, feedback loops that rely on exhaust sensing may take four or more cycles to adjust to variations in the air to fuel ratios in individual combustion chambers 12.

In addition, the methods described herein may allow control of additional engine parameters. As an example, estimating the temperature and pressure of gas in the combustion chamber 12 as described herein may enable fuel that is supplied to a compression ignition engine to be controlled in order to control temperature and/or pressure of gas in the combustion chamber 12. The temperature and/or pressure of gas in the combustion chamber 12 may be controlled by adjusting the quantity of fuel provided to the combustion chamber 12 during the combustion process in response to the estimated temperature and pressure of the gas in the combustion chamber 12.

As another example, the timing of the ignition event in the combustion chamber 12 may be controlled based on comparing the estimated burn rate using the example methods described herein to burn rate tables in order to optimize the efficiency of the internal combustion engine 10. The burn rate tables may provide optimum burn rates at various positions, such as momentary angle A, of a component (such as crankshaft 22) in the internal combustion engine 10. The timing of the ignition event in the combustion chamber 12 may be optimized for both spark ignited and compression ignited internal combustion engines 10.

Other methods are contemplated wherein the inertia of the internal combustion engine 10 may not be constant. As an example, the rotating component 20 may be selectively connected to different loads, such as a transmission. The effective inertia of the rotating component 20 may be determined by collecting position speed and angular acceleration data during the intake and exhaust stroke of the internal combustion engine 10. The pressure of the gas in the combustion chamber 12 may be known during the intake and exhaust stroke of the internal combustion engine 10. The calculated effective inertia may then be used to calculate the torque of the internal combustion engine 10 using any of the methods described herein.

In addition, the methods described herein may be used to establish the mechanical condition of the internal combustion engine 10. As an example, a valve train failure may decrease the volumetric efficiency of the combustion chamber 12. This decrease in volumetric efficiency may result in a lower than expected pressure within the combustion chamber 12.

The methods described herein may also be used to validate various sensors on the internal combustion engine 10 that are measured by the controller 40. As an example, the intake manifold pressure sensor 21 may indicate an inaccurately high intake manifold pressure due to a leak in the connection between the intake manifold 23 and the intake manifold pressure sensor 21. This inaccurately high intake manifold 23 pressure may indicate to the controller 40 that the pressure in the combustion chamber 12 should be higher than is measured by the methods described herein.

The example systems and methods may be utilized to determine a momentary burn rate in the combustion chamber 12 in order to control the burn rate in the combustion chamber 12. Controlling the burn rate may permit the internal combustion engine 10 to produce fewer harmful emissions.

The example systems and methods may also be utilized to determine a temperature and/or a pressure of a gas in the combustion chamber 12 in order to control the burn rate in the combustion chamber 12 such that the temperature and/or pressure of the gas remain below a certain level in the combustion chamber 12. Controlling the temperature and/or pressure of the gas in the combustion chamber 12 below a certain level may permit the internal combustion engine 10 to produce fewer harmful emissions.

The methods, devices, and logic described above may be implemented in many different ways in many different combinations of hardware, software or both hardware and software. For example, all or parts of the controller 40 may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

The methods described may include determinations in relation to one or more thresholds. While these methods may refer to a determination about whether a parameter exceeds a threshold, the determination may in other variations be whether the parameter is greater than or equal to, less than, equal to, or less than or equal to a threshold. Other variations are possible.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An internal combustion engine comprising:
   a combustion chamber;
   a rotating component;
   a sensing system that detects an angular position of the rotating component; and
   a controller that calculates a ratio between air and fuel in the combustion chamber based on the detected position of the rotating component, wherein the controller calculates a speed of the rotating component and an acceleration of the rotating component based on the detected position of the rotating component, wherein the controller determines a burn rate of the air and the fuel in the combustion chamber based on the speed of the rotating component, the acceleration of the rotating component, and the detected position of the rotating component.

2. The internal combustion engine of claim 1, wherein the rotating component is a crankshaft.

3. The internal combustion engine of claim 1, wherein the controller calculates the ratio between the air and the fuel within the combustion chamber based on changes in the burn rate when the controller initiates specific changes in a quantity of the fuel provided to the combustion chamber.

4. The internal combustion engine of claim 1, wherein the controller adjusts a quantity of the fuel provided to the combustion chamber based on the ratio between the air and the fuel in the combustion chamber.

5. The internal combustion engine of claim 4, further comprising a plurality of combustion chambers, wherein the controller calculates the ratio between the air and the fuel in each of the plurality of combustion chambers and individually adjusts a quantity of the fuel provided to each combustion chamber.

6. The internal combustion engine of claim 1, further comprising a gear that includes teeth, the gear attached to the rotating component; and
   wherein the gear has teeth omitted to provide a position reference to the controller
   wherein the sensing system detects a position of the rotating component by detecting the teeth on the gear.

7. The internal combustion engine of claim 1, wherein the controller calculates the ratio between the air and the fuel within the combustion chamber based on the position of the rotating component and a pressure of the air entering the combustion chamber.

8. The internal combustion engine of claim 1, wherein the controller calculates the ratio between air and fuel within the combustion chamber based on the position of the rotating component and a time of initiation of combustion of the air and fuel within the combustion chamber.

9. The internal combustion engine of claim 1, wherein the fuel comprises diesel fuel.

10. The internal combustion engine of claim 1, wherein the fuel comprises gasoline.

11. An internal combustion engine comprising:
    a combustion chamber;
    a rotating component;
    a sensing system that detects an angular position of the rotating component; and
    a controller that calculates a ratio between air and fuel in the combustion chamber based on the detected position of the rotating component, wherein the controller ignores or does not calculate the ratio between the air and the fuel within the combustion chamber, and does not adjust a quantity of the fuel provided to the combustion chamber, when the controller detects abnormal combustion of the air and the fuel within the combustion chamber.

12. A method comprising:
    receiving data indicating a volume of a combustion chamber; and
    calculating, with a processor, a ratio between air and fuel in the combustion chamber based on the volume of the combustion chamber, wherein calculating a ratio between the air and fuel in the combustion chamber comprises determining a burn rate of the air and fuel in the combustion chamber based on a first rate of change corresponding to a rate of change of the volume and a second rate of change corresponding to a rate of change of the first rate of change.

13. The method of claim 12, wherein receiving data indicating the volume of the combustion chamber comprises sensing an angular position of a crankshaft that moves a piston, the piston partially defining the volume of the combustion chamber.

14. The method of claim 12, further comprising calculating a temperature of the air and the fuel in the combustion chamber; and adjusting the fuel supplied to the combustion chamber to control the temperature of the air and fuel in the combustion chamber.

15. The method of claim 12, further comprising adjusting the fuel supplied to the combustion chamber to control the ratio between the air and the fuel in the combustion chamber.

16. The method of claim 12, further comprising calculating a pressure of the air and the fuel in the combustion chamber; and adjusting the fuel supplied to the combustion chamber to control the pressure of the air and the fuel in the combustion chamber.

17. A method comprising:

receiving data indicating a volume of a combustion chamber; and calculating, with a processor, a ratio between air and fuel in the combustion chamber based on the volume of the combustion chamber, and further comprising not calculating the ratio between air and fuel within the combustion chamber when the controller detects abnormal combustion of air and fuel within the combustion chamber.

* * * * *